United States Patent
Tipp et al.

(10) Patent No.: US 10,067,360 B2
(45) Date of Patent: Sep. 4, 2018

(54) EYEGLASS FRAMES WITH DYNAMIC VENT

(71) Applicant: Under Armour, Inc., Baltimore, MD (US)

(72) Inventors: Alan Scott Tipp, Elkhorn, NE (US); Jonathan Michael Martin, Covington, KY (US); Adam Harris Kaufer, Cutchogue, NY (US)

(73) Assignee: Under Armour, Inc., Baltimore, MD (US)

( * ) Notice: Subject to any disclaimer, the term of this patent is extended or adjusted under 35 U.S.C. 154(b) by 47 days.

(21) Appl. No.: 14/616,265

(22) Filed: Feb. 6, 2015

(65) Prior Publication Data

US 2016/0231598 A1  Aug. 11, 2016

(51) Int. Cl.
*G02C 11/08* (2006.01)
*G02C 1/04* (2006.01)
*G02C 5/10* (2006.01)

(52) U.S. Cl.
CPC ............... *G02C 11/08* (2013.01); *G02C 1/04* (2013.01); *G02C 5/10* (2013.01); *G02C 2200/18* (2013.01)

(58) Field of Classification Search
CPC . G02C 11/08; G02C 5/10; G02C 1/04; G02C 2200/18; A61F 9/028
USPC .......... 351/62, 158, 435, 436, 437; 564/435, 564/436, 437
See application file for complete search history.

(56) References Cited

U.S. PATENT DOCUMENTS

| | | | | |
|---|---|---|---|---|
| 3,517,393 A | * | 6/1970 | Beauchef | G02C 11/08 2/436 |
| 4,240,718 A | | 12/1980 | Wichers | |
| 4,877,320 A | | 10/1989 | Holden | |
| 4,955,706 A | * | 9/1990 | Schmidthaler | G02C 5/00 351/41 |
| 5,363,512 A | * | 11/1994 | Grabos, Jr. | G02C 11/08 2/436 |
| 6,050,684 A | | 4/2000 | Mage | |
| 6,550,914 B1 | | 4/2003 | Kopfer | |
| 6,959,988 B1 | | 11/2005 | Sheldon | |
| 6,971,745 B2 | | 12/2005 | Sheldon | |
| 7,083,276 B2 | | 8/2006 | Olney | |

(Continued)

FOREIGN PATENT DOCUMENTS

WO   WO 96/24315   * 8/1996   ............... A61F 9/02

*Primary Examiner* — Stephone B. Allen
*Assistant Examiner* — Rahman Abdur
(74) *Attorney, Agent, or Firm* — Maginot, Moore & Beck LLP

(57) ABSTRACT

Eyeglass frames include a face member and two temple members connected to the face member. The face member includes a rim with a brow configured to retain at least one lens. A vent passage is provided in the brow and extends from a front portion of the brow to a rear portion of the brow. A vent adjustment member provided on the brow directly above the at least one lens. The vent adjustment member is configured to move between a first position wherein the vent passage is substantially closed and a second position wherein the vent passage is open. The vent adjustment member is substantially flush with a medial portion and a lateral portion of the brow when the vent adjustment member is in the first position and offset from the medial portion and lateral portions of the brow when the vent adjustment member is in the second position.

9 Claims, 6 Drawing Sheets

(56) References Cited

U.S. PATENT DOCUMENTS

| | | |
|---|---|---|
| 7,091,634 B2 | 8/2006 | Yi et al. |
| 7,278,733 B2 | 10/2007 | Olney |
| 8,083,344 B2 | 12/2011 | Blanshay et al. |
| 8,303,109 B2 | 11/2012 | Matera |
| 2007/0252943 A1 | 11/2007 | Welchel |
| 2010/0118258 A1 | 5/2010 | Quintana |
| 2014/0063438 A1* | 3/2014 | Cater ................. A61F 9/028 351/62 |

* cited by examiner

EYEGLASS FRAMES WITH DYNAMIC VENT

FIELD

This document relates to the field of eyeglasses, and particularly to ventilation arrangements for eyeglass frames.

BACKGROUND

Eyeglasses have been used for hundreds of years to provide vision assistance to wearers. Eyeglasses typically comprise a frame (which may also be referred to herein as "frames") configured to retain a lens (or "lenses"). The frame includes a face member including two eyewires or rims that hold the lenses. A bridge that connects the two rims. The bridge may include a nosepiece that allows the rims to rest more comfortably on a wearer's nose. A temple member extends from the lateral side of each rim. The temple member is designed to extend rearwardly on the head of the wearer and over the ears in order to provide a resting position for the eyeglasses on the face of the wearer.

Eyeglasses provide vision assistance to the wearer in various ways. Prescription lenses provide corrective vision for the wearer, assisting the wearer in seeing near or distant objects more clearly. Eyeglasses may also provide protection for the eye of the wearer, including protection from wind or from flying debris. Eyeglasses with light blocking features are commonly referred to as sunglasses. Sunglasses may or may not include corrective lenses, but provide the benefit of blocking bright or excessive light from the eyes of a wearer.

Sunglasses may be particularly useful for a wearer participating in athletic events. In these situations, the glasses should provide vision benefits including protection from light, wind and other elements. Additionally, sunglasses for athletic events typically are typically designed to cover a wide field of vision, including both central and peripheral vision of the wearer. Accordingly, the lenses for sunglasses tend to extend across a relatively large area covering the eyes of the wearer. Often, these lenses are retained relatively close to the wearer's face in order to further limit the amount of direct light reaching the eyes of the wearer. Unfortunately, these relatively large lenses worn close to the face limit the amount of airflow across the interior surface of the lenses. This reduced airflow across the rear of the lenses results in fogging when condensation is formed on the rear surface of the lenses. Fogging of the lenses is particularly problematic in high humidity conditions, or when the athlete is perspiring.

Various arrangements have been used in the past to avoid lens fogging. For example, many sunglasses incorporate ventilation features designed to allow heat to escape from the space between the lens and the face of the wearer. Some ventilation arrangements also encourage airflow through the space between the lens and the face of the wearer. Unfortunately, these ventilation features tend to allow additional light to reach the eyes of the wearer, thus reducing the effectiveness of the sunglasses. Additionally, while ventilation is sometimes useful for a wearer, there are occasions when the ventilation may be counter-productive. For example, in high wind conditions additional ventilation may result in too much airflow across the eyes of the wearer, thus drying the eyes and generally resulting in discomfort to the wearer.

In view of the foregoing, it would be advantageous to provide sunglasses and other eyeglasses that are configured to reduce fogging without allowing a significant amount of additional light to pass through the sunglasses to the eyes of the wearer. It would also be advantageous if ventilation features provided by the sunglasses were configured to limit airflow in certain situations where additional ventilation is not desired. Additionally, it would be desirable if the anti-fogging and ventilation features were inconspicuous on the eyeglasses and seamlessly incorporated into other functional and aesthetic features of the eyeglasses.

SUMMARY

In accordance with one exemplary embodiment of the disclosure, there is provided eyeglass frames comprising a face member including a rim with a brow. The rim is configured to retain at least one lens. Two temple members are connected to the face member. A vent passage is provided in the brow. A vent adjustment member is also provided on the brow directly above the at least one lens. The vent adjustment member is configured to move between a first position wherein the vent passage is substantially closed and a second position wherein the vent passage is open. The vent adjustment member is substantially flush with a medial portion and a lateral portion of the brow immediately adjacent to the vent adjustment member when the vent adjustment member is in the first position. The vent adjustment member offset from the medial portion and lateral portion of the brow when the vent adjustment member is in the second position.

Pursuant to another exemplary embodiment of the disclosure, there is provided eyeglass frames comprising a face member including a rim with a brow. The rim is configured to retain at least one lens. Two temple members are connected to the face member. A vent passage is provided in the brow. A vent adjustment member is also provided on the brow directly above the lens and between medial and lateral portions of the brow immediately adjacent to the vent adjustment member. The vent adjustment member is configured to move between a first position wherein the vent passage is substantially obstructed and a second position wherein the vent passage is substantially unobstructed. The vent adjustment member provides a substantially continuous brow surface with the medial and lateral portions of the brow when the vent adjustment member is in the first position. A first seam is provided at between the juxtaposed medial portion of the brow and the vent adjustment member, and wherein a second seam is provided between the juxtaposed lateral portion of the brow and the vent adjustment member.

According to yet another exemplary embodiment of the disclosure, eyeglasses comprise frames including rims and temple members. Each rim includes a brow with a brow recess. A lens is retained by each rim, with the lens including an upper edge with a lens indentation formed between a medial side and a lateral side of the upper edge of the lens. A vent adjustment member is provided in the brow recess. The vent adjustment member includes an anterior portion comprised of a first material and a posterior portion comprised of a second material. The first material has a greater hardness than the second material. The vent adjustment member is moveable between a first position wherein a vent passage extending through the brow recess is substantially closed, and a second position wherein the vent passage extending through the brow recess is substantially open.

The above described features and advantages, as well as others, will become more readily apparent to those of ordinary skill in the art by reference to the following detailed description and accompanying drawings. While it would be desirable to provide an eyeglass frame that provides one or more of these or other advantageous features, the teachings disclosed herein extend to those embodiments which fall within the scope of the appended claims, regardless of whether they accomplish one or more of the above-mentioned advantages.

DESCRIPTION

Figure 1:
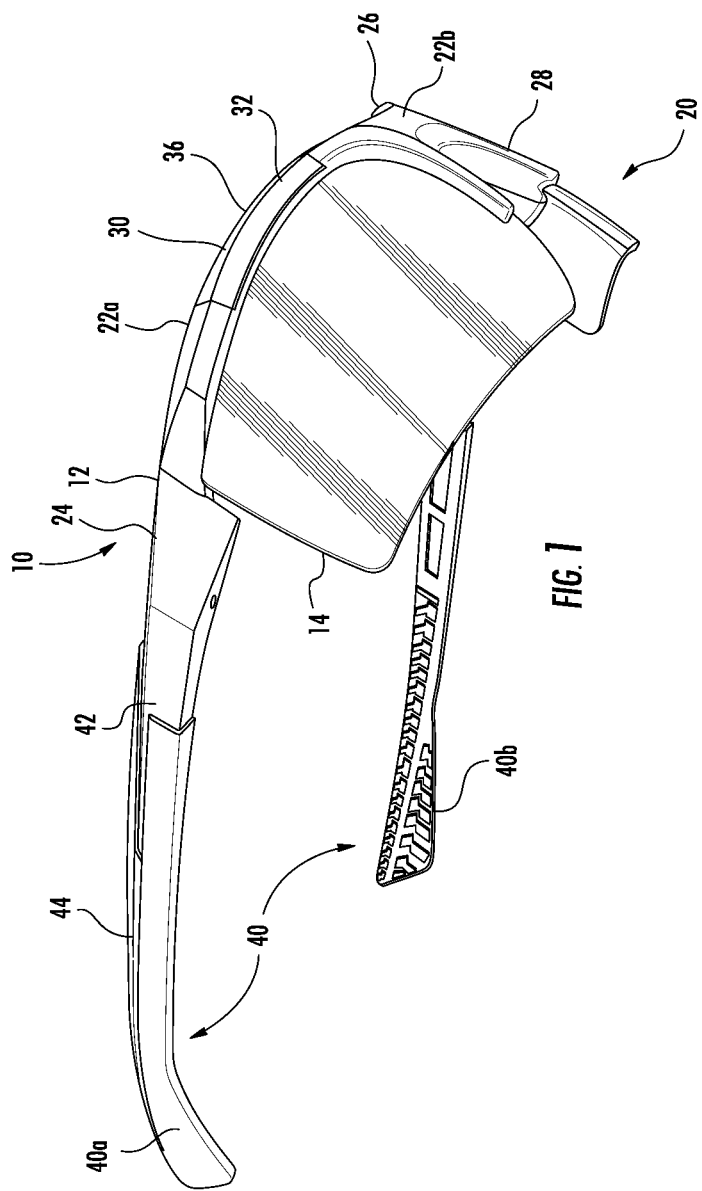
FIG. 1 is a right side perspective view of eyeglasses including a frame with a dynamic vent arrangement provided on a brow of the frame with the vent arrangement in a closed position.

With reference to FIG. 1, in at least one embodiment, a set of eyeglasses 10 includes eyeglass frames 12 with a pair of lenses 14 supported by the frames 12. The frames 12 include a face member 20 and a pair of temple members 40 connected to the face member 20. The eyeglasses 10 also include a vent arrangement 50 with a dynamic vent adjustment member 51 that is moveable between an open and a closed position.

The face member 20 is configured to extend across the face of a wearer and retain the lenses 14 in position over the eyes of a wearer of the eyeglasses 10. The temple members 40 are configured to extend rearwardly from the face member 20 and rest on the ears of the wearer. Accordingly, the frames 12 are supported by the head of the wearer with the face member 20 engaging the nose of the wearer and the temple members 40 engaging the ears of the wearer.

The lenses 14 of the eyeglasses 10 may be provided as any of various lens types as will be recognized by those of ordinary skill in the art. Examples of different types of lenses include prescription and non-prescription lenses, darkened lenses, or lenses with any of various additional features such as shatter-proof lenses, glare-resistant lenses, polarized lenses, or any of various other types of lenses. If the lenses 14 are darkened or include light blocking features, the eyeglasses may be considered "sunglasses". In some embodiments, the lenses 14 may be transitional lenses that change from transparent to translucent/darkened when exposed to ultra-violet radiation. Although two lenses 14 are shown in the embodiment of FIG. 1, the eyeglass 10 may alternatively be configured to retain a unitary lens provided by a single piece of plastic or glass which covers both eyes of the wearer.

Figure 2:
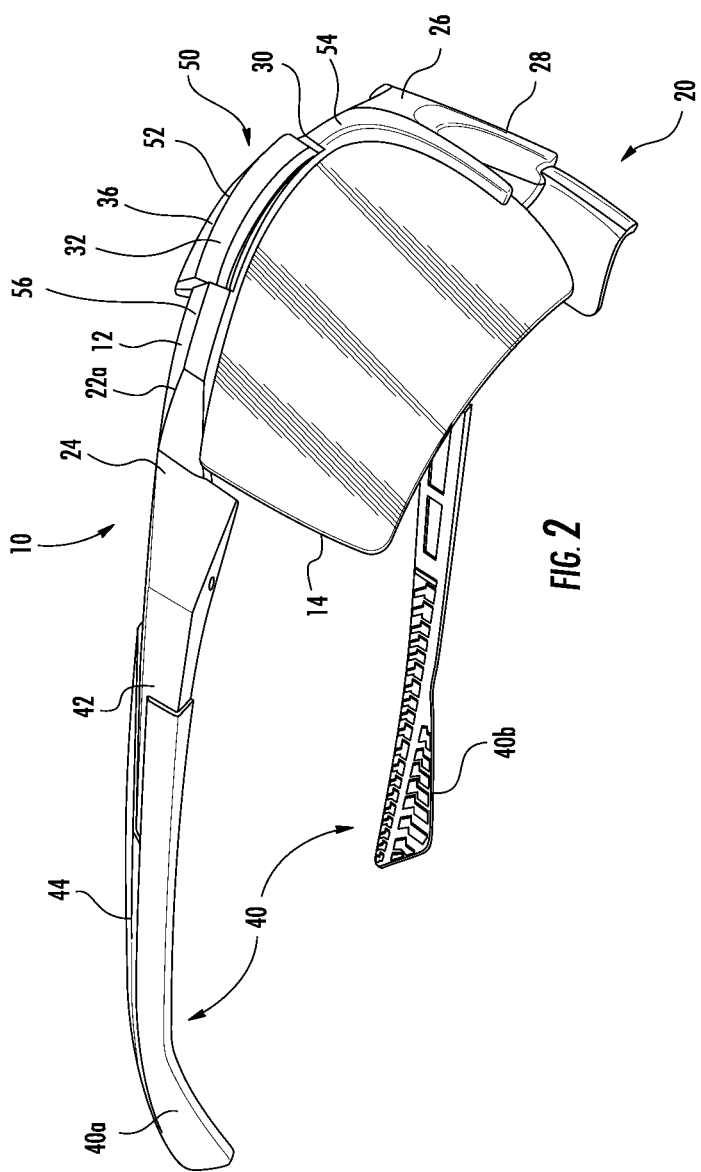
FIG. 2 is a right side perspective view of the eyeglasses of FIG. 1 with the vent arrangement in an open position.

The face member 20 includes a pair of rims 22, rim extension member 24 and a bridge 26. The rims 22 include a right rim 22a and a left rim 22b. As used herein, the singular term "rim 22" refers to either the right rim 22a or the left rim 22b, and the plural term "rims 22" refers to both the right rim 22a and the left rim 22b. The rims 22 are configured to retain the lenses 14. In the embodiment of FIGS. 1 and 2, each rim 22 is a partial rim that does not completely encircle the lens 14 retained by the rim 22. However, it will be recognized that, in alternative embodiments, the rims 22 may be a full rims that completely encircle the lenses.

With continued reference to FIG. 1, each rim 22 includes a brow 30 defined by the portion of the rim 22 extending over the lens 14. Each rim 22 further includes a front surface 32, a rear surface 34, an upper surface 36, and a central groove 38 (see FIG. 3) formed on the lower side of the brow between the front surface 32 and the rear surface 34. The central groove 38 is configured to receive one of the lenses 14. Each lens 14 is retained in the central groove 38 using any of various fastening means, such as an adhesive or a screw or other fastener, or some combination thereof. If a fastener is used, the fastener may extend through the rear surface 34 and the lens 14 and into the portion of the rim 22 that is forward of the central groove 38. Each lens 14 includes a cut-out or indentation 16 along the upper edge of the lens 14 in the area of the brow 30. Beside this indentation 16, the sides 18 of the lens extend upward into the rim 22. As explained in further detail below, the upper edge of the lens 14 at the indentation 16 is substantially flush with or slightly covered by the lower edge of the vent adjustment member 51 when in a downward position. However, the upper edge of the lens 14 at the indentation 16 is exposed when the vent adjustment member 51 is in an upward position.

The bridge 26 of the face member 20 is provided at a medial side of each rim 22. The bridge 26 includes a lower surface 28 that is contoured in an arch-like shape to curve around the nose of the wearer. The bridge 26 joins the right side rim 22a to the left side rim 22b. In the embodiment of FIGS. 1 and 2, the bridge 26 is provided as a unitary component with the rims 22. The unitary component may be molded or otherwise formed from any of various materials as will be recognized by those of ordinary skill in the art. For example, the rims 22 and the bridge 26 of the face member may be comprised of a thermoplastic polyamide based on aliphatic and cycloaliphatic blocks. In other exemplary embodiments, the rims 22 and the bridge 26 of the face member may be comprised of other materials, such as thermoplastic polyurethane or other polymer materials. A nose pad (not shown) may be coupled to the bridge 26 to rest on the nose of the wearer. The nose pad may be comprised of a resilient material having a lesser hardness than the rims 22 and bridge 26 such that the nose pad is comfortable against the skin of the wearer and helps secure the frames 12 in place on the face of the wearer.

The lateral side of each rim 22 is connected to a rim extension member 24. The rim extension member 24 is generally an enlarged portion of the frames 12 that is provided on the lateral sides of the face member 20 between the lenses 14 and the temple members 40. In at least some embodiments, a hinge (not shown) is provided at the rim extension member 24. The hinge allows the associated temple member 40 to pivot about a pivot axis defined by the hinge. It will be recognized that in certain other embodiments, the frames 12 may be configured without a hinge between the face member 20 and the temple members 40.

Two temple members 40 are connected to the face member 20. As used herein, the singular term "temple member 40" refers to either the right temple member 40a or the left temple member 40b, and the plural term "temple members 40" refers to both the right temple member 40a and the left temple member 40b. Each temple member 40 extends rearwardly from the face member 20 to a position configured to rest behind the ear of the wearer. Each temple member 40 is generally elongated in form and may include an end portion that curves either downward or inward, or both downward and inward. In the embodiment of FIG. 1, each temple member 40 includes a temple frame member in the form of an elongated temple column 42 and a temple overlay 44. The temple column 42 provides structural support for the temple arrangement and is configured to retain the temple overlay 44. The column 42 is comprised of a first material and the overlay 44 is comprised of a second material, the first material of the column 42 being harder and more rigid than the second material of the overlay 44.

The frames 12 of the eyeglasses 10 may be comprised of various materials with different qualities. For example, the rims 22 and temple column 42 may be comprised of a first material and the overlay 44 and nose pad may be comprised of a second material that having a lesser hardness (e.g., a lesser durometer) than the first material. For example, the first material may be a thermoplastic polyamide based on aliphatic and cycloaliphatic blocks and does not contain a plasticizer. The thermoplastic polyamide material may exhibit good heat resistance, excellent fatigue behavior, low moisture absorption and dimensional stability. One exemplary material that may be used as the first material is GRILAMID® TR 90. It will be recognized that various other materials may also be used as the first material. For example, in at least one embodiment, the first material is a nylon based polymer material. The second material may be provided by a thermoplastic elastomer (TPE) material such as a thermoplastic polyurethane (TPU). In other embodiments, the second material may be comprised of natural or synthetic rubber materials or any of various other polymer materials.

With reference now to FIG. 2, a vent arrangement 50 is provided in the brow 30 directly above each lens 14. The vent arrangement 50 includes a moveable vent adjustment member 51 incorporated into a recess 53 in the brow 30. The recess 53 is provided between a medial portion 54 and a lateral portion 56 of the brow. In the embodiment disclosed herein, the vent adjustment member 51 includes a block 52 positioned in a forward portion of the brow and a seal 74 that is connected to a posterior side of the block 52. In other embodiments, the vent adjustment member may take other forms with one or more different components. As shown in FIGS. 1 and 2, the block 52 is configured to open or close a vent passage 99 (see FIG. 5B) that extends through the brow 30. When the block 52 is in a downward position, as shown in FIG. 1, the vent passage 99 is closed or obstructed. When the block 52 is in an upward position, as shown in FIG. 2, the vent passage 99 is open or unobstructed.

Figure 3:
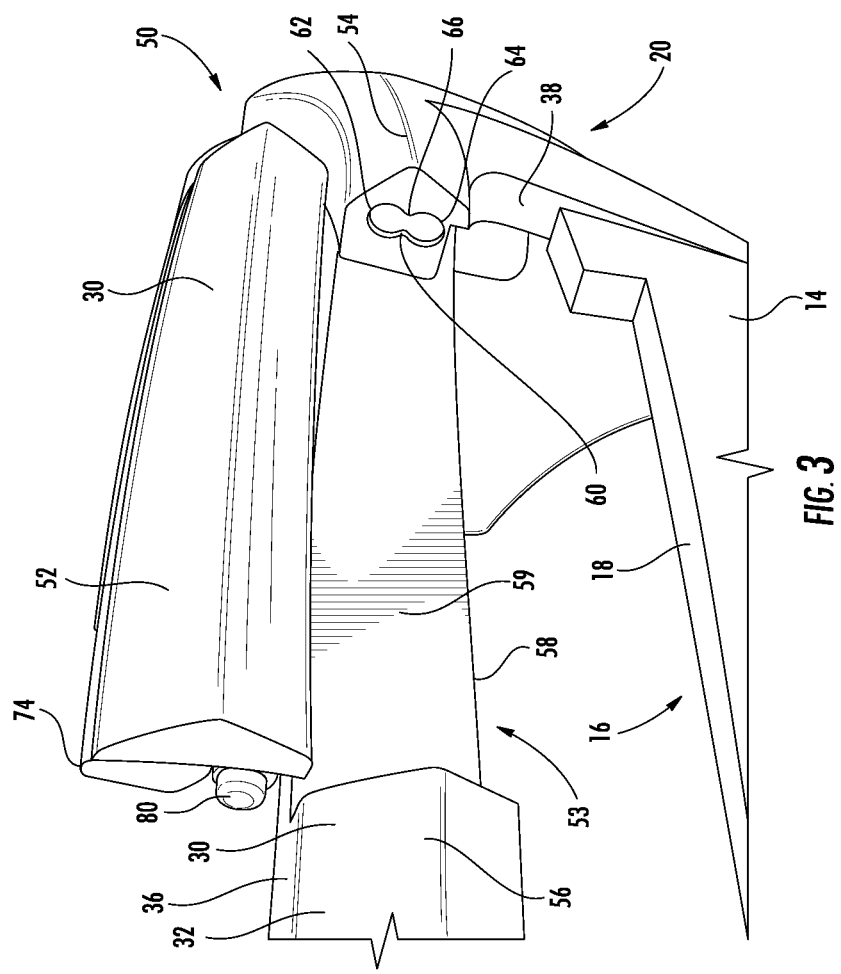
FIG. 3 is an exploded view of the vent arrangement of FIG. 1.

With reference now to FIG. 3, an exploded and enlarged view of the brow 30 is shown. The brow 30 includes the block 52 of the vent arrangement 50, the medial portion 54 provided on a medial side of the block 52, the lateral portion 56 provided on a lateral side of the block 52, and a posterior segment 58 provided on a posterior side of the block. The medial portion 54 of the brow is a substantially solid component extending from the front surface 32 to the posterior surface 34 of the rim 22. The medial portion 54 includes a medial groove 60 that faces the block 52. The medial groove 60 includes an enlarged upper recess 62 and an enlarged lower recess 64 separated by a neck 66. The upper recess 62 and the lower recess 64 are each rounded in shape. As a result, the perimeter of the medial groove 60 resembles an outline of the number "8".

Similarly, the lateral portion 56 is a substantially solid component extending from the front surface 32 to the posterior surface 34 of the rim 22. The shape of the front surface 32 of the rim 22 is substantially the same on both the medial portion 54 and the lateral portion 56 of the brow. The lateral portion 56 also includes a lateral groove (not shown) that faces the block 52 and is substantially identical in size and shape to the medial groove 60. As explained in further detail below, the medial groove 60 and the lateral groove together provide a track in which the block 52 rides when moving between the downward position (as shown in FIG. 1) and the upward position (as shown in FIG. 2).

With continued reference to FIG. 3, the block 52 is also a solid component configured to fit within the recess 53 in the brow between the medial portion 54 and the lateral portion 56 of the brow 30. The block 52 is positioned in the recess 53 above the lens 14 on the anterior side (which may also be referred to herein as a "forward" side) of the brow 30. The posterior segment 58 of the brow is positioned behind the block 52 on the posterior side (which may also be referred to herein as the "rearward side") of the brow 30. The block 52 has a width that extends across a portion of the brow a distance of about 1 cm to 4 cm. Larger or greater widths for the block 52 are possible, but it may be difficult for a user to move the block between the upward and downward positions with blocks that are smaller or greater in width.

Figure 4A:
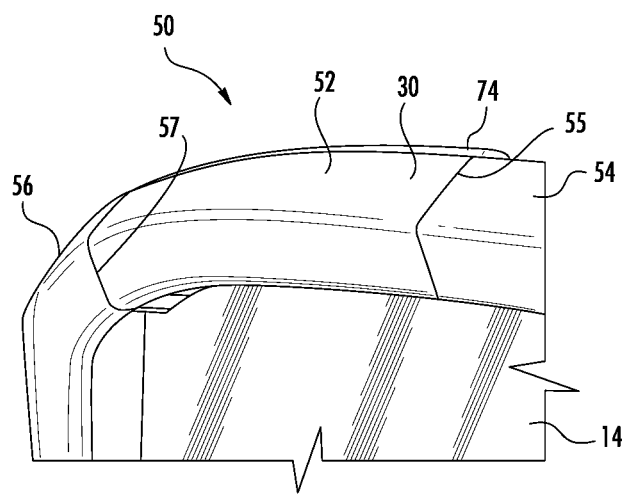
FIG. 4A is an enlarged perspective view of a brow of the eyeglasses of FIG. 2 with the vent arrangement in the closed position.
Figure 4B:
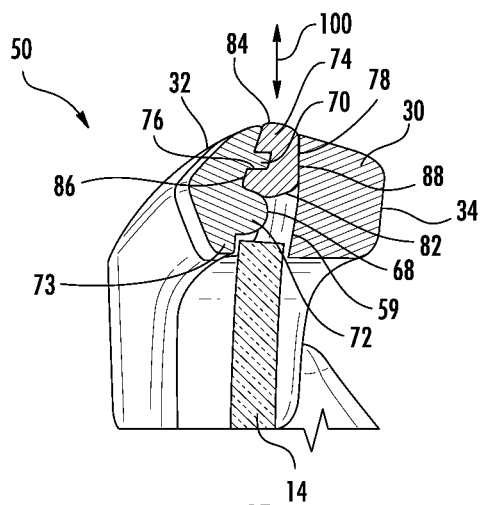
FIG. 4B is a cross-sectional view along line B-B of FIG. 4A showing the vent arrangement in the closed position.
Figure 5A:
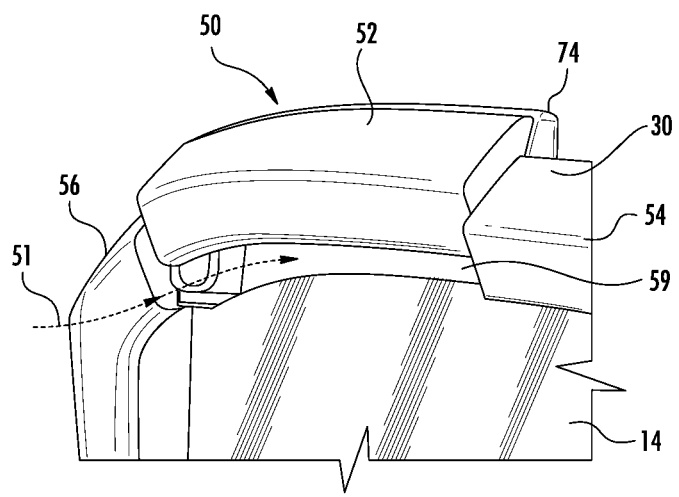
FIG. 5A is an enlarged perspective view of a brow of the eyeglasses of FIG. 2 with the vent arrangement in the open position.
Figure 5B:
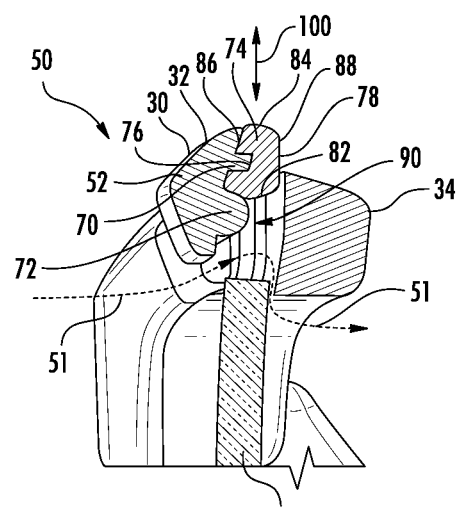
FIG. 5B is a cross-sectional view along line B-B of FIG. 5A showing the vent arrangement in the open position.

The block 52 extends rearwardly from the front surface 32 of the rim 22 to an intermediate surface 68 that faces the posterior segment 58 of the brow 30. The thickness of the block from the front surface 32 to the intermediate surface 68 is between about 3 mm and 7 mm. The shape of the front surface 32 of the rim 22 is substantially similar across the entire brow 30, including the medial portion 54, the block 52, and the lateral portion 56. In the embodiment disclosed herein, the front surface 32 of the rim 22 is substantially triangular in shape (i.e., as shown in FIG. 5B a triangle is formed by two lines defined by the angled surfaces extending from a forward apex on the front surface with the third line defined through the block and connecting the posterior edges of the front surface of the block 52). This triangular shape provides an arrow-dynamic form across the front surface of the brow 30. Additionally, the front surface of the block 52 is substantially flush with and aligned with the front surface of the medial portion 54 and the lateral portion 56 of the brow 30 when the block 52 is in the downward position, as shown in FIGS. 4A and 4B. As a result, the surface of the brow appears to be substantially continuous and generally uninterrupted when viewed from the face of the eyeglasses 10.

As best shown in FIG. 4B, the intermediate surface 68 of the block 52 (i.e., the surface opposite the front surface), is contoured and includes an upper rib 70 and a lower rib 72. The upper rib 70 and the lower rib 72 both extend horizontally across the intermediate surface 68 of the block 52. The upper rib 70 has a slightly smaller diameter and is slightly less rounded than the lower rib 72. As shown in FIG. 4B, the lower rib 72 is positioned directly above the lens 14 and is in relatively close proximity to the lens 14 when the block 52 is in the downward position. At the same time, a lower lip 73 of the block 52 extends downward past the upper edge of the lens 14 when the block 52 is in the downward position. Accordingly, the lower rib 72 and the lower lip 73 substantially cover the upper forward edge of the lens 14 when the block 52 is in the downward position. As a result, airflow over the upper edge of the lens 14 (and through the vent passage 99) is substantially blocked when the block 52 is in the downward position.

A seal 74 is retained on intermediate surface 68 of the block 52. The seal 74 includes a lower surface 82, an upper surface 84, an anterior-facing surface 86, and a posterior-facing surface 88. The seal 74 is generally elongated and extends laterally across the entire block. The lower surface 82 of the seal 74 is positioned in the middle portion of the block 52, with the lower surface 82 of the seal 74 engaging the lower rib 72 of the block 52. The seal extends upwardly from the lower surface 82 to the upper surface 84 as a substantially solid component. The upper surface 82 of the seal 74 is positioned slightly above the upper edge of the block 52 (e.g., between about 0.5 and 1 mm above the upper edge of the block 52).

The anterior-facing surface 86 of the seal 74 includes an elongated C-shaped cavity 76 designed and dimensioned to securely receive the upper rib 70. An adhesive or other bonding material may be provided in the C-shaped cavity to help maintain the placement of the seal 74 on the upper rib 70. The lower portion of the anterior-facing surface 86 is trapped between the upper rib 70 and the lower rib 72. Accordingly, the seal 74 engages both the upper rib 70 and the lower rib 72 on the intermediate surface 68 of the block 52. The posterior-facing surface 88 of the seal 74 includes a slightly-bowed sealing surface that engages a deflection surface 59 on the posterior segment 58 of the brow 30.

The seal 74 is generally comprised of a material having a lesser hardness than the block 52. For example, the seal 74 may be comprised of a rubber material or a thermoplastic elastomer material (such as the same material provided by the overlay 44), while the block 52 is comprised of a thermoplastic polyamide generally having a greater hardness than the seal 74 (such as the same material provided by other portions of the rim 22). The relatively soft and resilient material of the seal 74 allows the sealing surface 78 to closely engage the deflection surface 59 and block the passage of air between the sealing surface 78 and the deflection surface 59. Additionally, the relatively soft and resilient material of the seal 74 results in a surface with a relatively high coefficient of friction. As shown in FIG. 4B, when the block 52 is in the downward position, the seal 74 is pressed against the deflection surface 59, and the relatively high coefficient of friction of the seal resists upward movement of the block 52 while also dampening vibrations. Additionally, because the upper surface 82 of the seal 74 is positioned above the upper edge of the block 52, the seal may be used to engage the bill of a hat of the wearer, and further assist in stabilizing the eyeglasses 10 and the hat on the head of the wearer.

With continued reference to FIG. 4B, the deflection surface 59 is provided the posterior segment 58 of the brow 30 and defines the rear of the recess 53 in the brow 30. The deflection surface 59 is relatively smooth such that air is not disturbed when flowing over the deflection surface 59. The deflection surface 59 extends from the upper surface 36 of the brow 30 to a position behind the lens 14 on a lower surface of the brow. A thin channel 90 defines a relatively short distance between the deflection surface 59 and the lens 14. The channel 90 forms a part of the vent passage 99 and is sufficiently wide to allow air to flow through the channel 90. In at least one embodiment, the width of the channel (i.e., the distance between the deflection surface 59 and the lens 14) is between 0.5 mm and 3 mm, and is particularly about 1.5 mm. When the block 52 is in the downward position as shown in FIGS. 4A and 4B, the deflection surface 59 is substantially covered and is not exposed on the face of the eyeglasses 10.

With continued reference now to FIG. 4A, a first small seam 55 exists at the juxtaposition between the block 52 and the medial portion 54 of the brow, and a second small seam 57 exists at the juxtaposition between the block 52 and the lateral portion 56 of the brow. The first seam 55 and the second seam 57 are both provided by small voids/interrupted surfaces between the block 52 and the immediately adjacent medial and lateral portions 54 and 56 of the brow. These interrupted surfaces allow the block 52 to move relative to the medial and lateral portions 54 and 56. In particular, the block 52 is configured to move between the downward position of FIGS. 4A and 4B and the upward positions of FIGS. 5A and 5B, as noted by double-sided arrow 100.

With reference again to FIG. 3, the block 52 further includes a medial post (not shown) and a lateral post 80. The lateral post 80 is provided on the lateral side of the block 52 and is designed and dimensioned to slide in the lateral groove. In particular, the lateral post 80 is a cylindrical member that extends outwardly in a lateral direction on the lateral side of the block 52. In at least one embodiment, the lateral post extends outwardly between about 1 mm and 5 mm from the remaining surface on the lateral side of the block. The lateral post 80 is configured to ride within the lateral groove (which is substantially identical to the medial groove 60 shown in FIG. 3) in the lateral portion 56 of the brow 30. The medial post is substantially identical to the lateral post 80 and engages the medial groove 60 in the medial portion 54 of the brow 30.

When the block 52 is in the downward position, as shown in FIGS. 4A and 4B, the medial post and lateral post 80 are positioned within and substantially fill the lower recesses of the associated groove (e.g., medial groove 60). The necks 66 are dimensioned to retain the medial post and the lateral post 80 in the lower recesses unless a sufficient upward force in excess of a threshold force is provided on block 52 to force the medial post and the lateral post 80 through the necks 66 and into the upper recesses of the associated groove (e.g., upper recess 62 of the medial groove 60). When the wearer or other third party provides the sufficient upward force (which may be referred to herein as a "vent adjustment force") on the block 52, the block 52 is moved to the upward position as shown in FIGS. 5A and 5B. After the block 52 is moved to the upward position, the necks 66 are dimensioned to retain the medial post and the lateral post 80 in the upper recesses unless the vent adjustment force is provided on block 52 in a downward direction in order to force the medial post and the lateral post 80 through the necks 66 and into the lower recesses of the associated groove (e.g., lower recess 64 of the medial groove 60).

With reference now to FIGS. 5A-5B, when the block 52 is in the upward position, the front surface of the block 52 is offset from the front surface on the medial portion 54 and the lateral portion 56 of the brow 30. In particular, the front surface of the block 52 is positioned above the front surface of the medial portion 54 and the lateral portion 56 of the brow 30. As a result, the front surface 32 of the brow is interrupted with the block 52 no longer substantially flush and substantially continuous when the block 52 is in the upward position. As shown in FIG. 5B, the lower lip 73 of the block is directly above the lens 14 in this position, but the lower lip is in relatively distant proximity to the lens 14 when the block 52 is in the upward position (of FIG. 5B) as compared to the downward position (of FIG. 4B).

Figure 6:
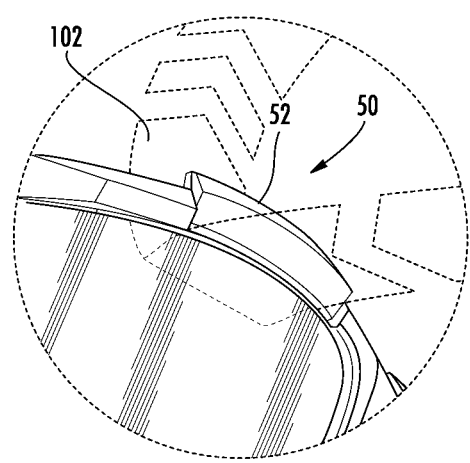
FIG. 6 is a perspective view of the vent arrangement of FIG. 1 showing heat transfer through the vent arrangement when a wearer is stationary.
Figure 7:
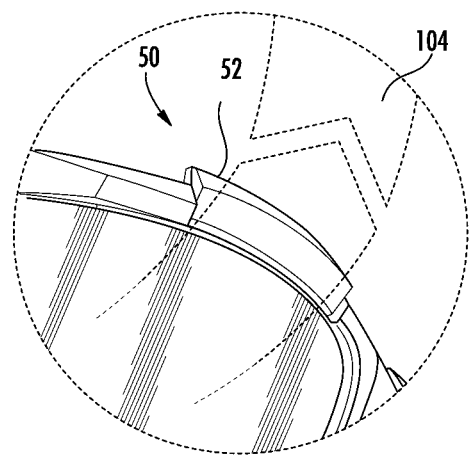
FIG. 7 is a perspective view of the vent arrangement of FIG. 1 showing airflow through the vent arrangement when the wearer is moving in a forward direction.

When the block 52 is in the upward position, the vent passage 99 is generally open and unobstructed, and air is allowed to flow through the vent passage 99. In this position, a substantial portion of the deflection surface 59 is exposed to the face of the eyeglasses. When the wearer is participating in a fast-moving sporting event, a significant amount of airflow through the eyeglasses is possible if the wearer moves the block 52 to the upward position. As shown in FIG. 6, air directed onto the face of the eyeglasses (noted by airflow 102) during forward movement of the wearer will flow between the block 52 and the lens 14, strike the deflection surface 59, and flow across the rear surface of the lens 14. Alternatively, when the wearer is more stationary, heat is allowed to escape from the rear surface of the lenses. As shown in FIG. 7, if air is not directed onto the face of the eyeglasses, heated air (noted by airflow 104) from behind the lens 14 will tend to flow up the deflection surface, between the lens 14 and the block 52, and over the front surface of the brow 30.

The foregoing detailed description of one or more exemplary embodiments of the eyeglass frames with releasable temple members has been presented herein by way of example only and not limitation. It will be recognized that there are advantages to certain individual features and functions described herein that may be obtained without incorporating other features and functions described herein. Moreover, it will be recognized that various alternatives, modifications, variations, or improvements of the above-disclosed exemplary embodiments and other features and functions, or alternatives thereof, may be desirably combined into many other different embodiments, systems or applications. Presently unforeseen or unanticipated alternatives, modifications, variations, or improvements therein may be subsequently made by those skilled in the art which are also intended to be encompassed by the appended claims. Therefore, the spirit and scope of any appended claims should not be limited to the description of the exemplary embodiments contained herein.

What is claimed is:

1. Eyeglass frames comprising:
a face member including a rim configured to retain at least one lens, the rim including a brow defined by an upper portion of the rim;
two temple members connected to the face member;
a vent passage provided in the brow; and
a vent adjustment member provided on the brow directly above the at least one lens, the vent adjustment member configured to move between a first position wherein the vent passage is substantially closed and a second position wherein the vent passage is open, the vent adjustment member substantially flush with a medial portion and a lateral portion of the brow immediately adjacent to the vent adjustment member when the vent adjustment member is in the first position, and the vent adjustment member offset from the medial portion and lateral portion of the brow when the vent adjustment member is in the second position,
wherein the vent adjustment member is provided by a moveable block that is aligned with the medial and lateral portions of the brow, the moveable block having a similar cross-sectional shape as the medial portion and the lateral portion of the brow such that a substantially continuous surface is provided from the medial portion of the brow, across the moveable block and to the lateral portion of the brow when the moveable block is in the first position, wherein the surface is interrupted and no longer substantially flush and substantially continuous when the moveable block is in the second position; and
wherein the moveable block includes a medial post and a lateral post, the medial post engaging a medial groove in the medial portion of the brow and the lateral post engaging a lateral groove in the lateral portion of the brow, the medial groove and the lateral groove each including an upper recess and a lower recess separated by a neck, wherein the moveable block is in the first position when the medial post and the lateral post are in the lower recesses, wherein the moveable block is in the second position when the medial post and the lateral post are in the upper recesses.

2. The eyeglass frames of claim 1 wherein the neck is designed and dimensioned to allow the moveable block to move from the second position to the first position when a vent adjustment force is applied to the moveable block, and wherein the neck is designed and dimensioned to prevent the moveable block from moving from the second position to the first position when the vent adjustment force is not applied to the moveable block.

3. The eyeglass frames of claim 1 wherein the moveable block extends between 1 cm and 4 cm in length between the medial and lateral portions of the brow.

4. The eyeglass frames of claim 1 wherein the rim is a partial rim comprised of a polymer material.

5. The eyeglass frames of claim 1 wherein the vent adjustment member includes an anterior portion and a posterior portion, the anterior portion comprised of a first material and the posterior portion comprised of a second material, the first material having a greater hardness than the second material.

6. The eyeglass frames of claim 5, wherein an upper surface of the posterior portion is positioned above an upper surface of the anterior portion.

7. The eyeglass frames of claim 6 wherein the anterior portion is a block member including a rib and the posterior portion is a seal member including a cavity configured to engage the rib.

8. The eyeglass frames of claim 1 wherein the vent adjustment member includes a moveable block provided in a recess in the brow, the recess defining a deflection surface on the brow, wherein the moveable block substantially covers the deflection surface when the moveable block is in the first position, and wherein a substantial portion of the deflection surface is exposed on a front of the face member when the moveable block is in the second position.

9. The eyeglass frames of claim 8 wherein a front surface of the moveable block is substantially triangular in shape.

* * * * *